Patented Dec. 4, 1928.

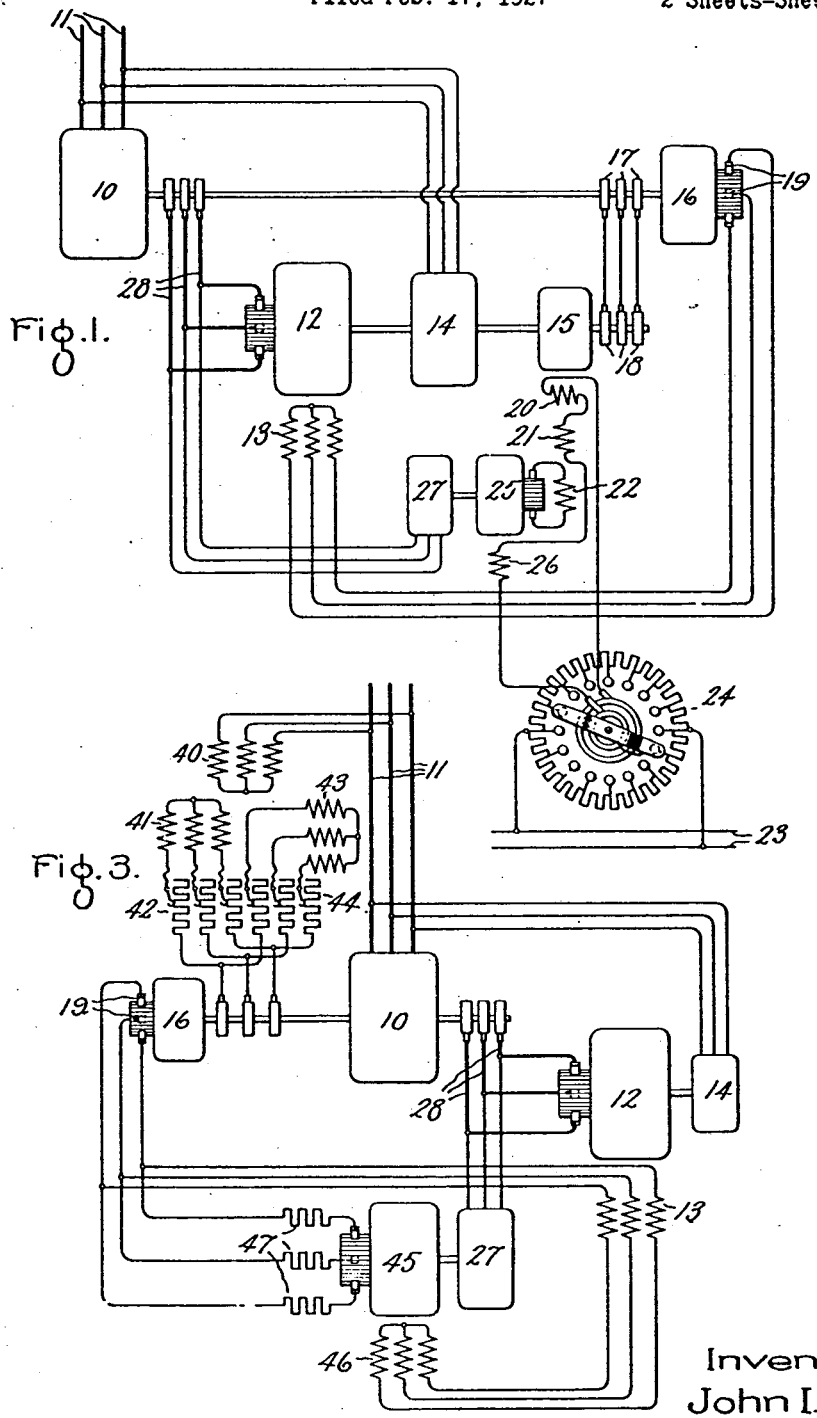

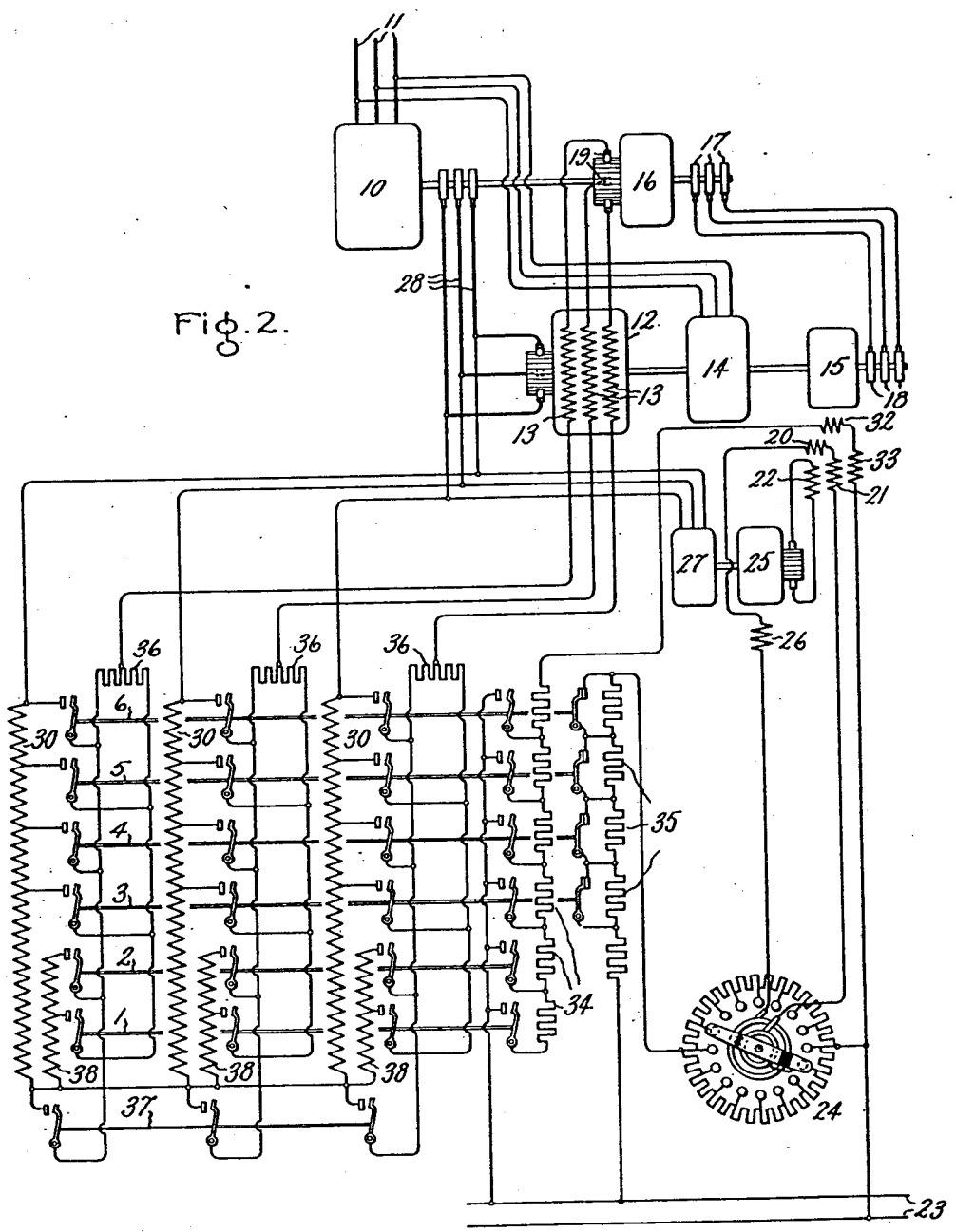

1,694,321

UNITED STATES PATENT OFFICE.

JOHN I. HULL, OF SCHENECTADY, NEW YORK, ASSIGNOR TO GENERAL ELECTRIC COMPANY, A CORPORATION OF NEW YORK.

SPEED-CONTROL SYSTEM.

Application filed February 17, 1927. Serial No 169,074.

My invention relates to speed control systems for induction motors and has for its object the provision of an improved arrangement for controlling the excitation of a commutator machine which is concatenated with an induction motor for the purpose of controlling its speed.

The theory of the control of the speed of induction motors by means of polyphase commutator regulating machines of the well-known Scherbius type in which the rotor is provided with a commutated winding and the stator with a neutralizing winding and an independent exciting winding has been pointed out in my United States Patent 1,306,594, assigned to the same assignee as the present invention. It is shown therein that this ideal regulation requires the injection into the independent exciting winding of the regulating machine of one component of voltage independent of slip frequency for the purpose of balancing the resistance drop in said exciting winding and a second component of voltage varying in approximate proportion to the slip frequency for the purpose of balancing the inductive drop. The present application relates to improvements in the means for accomplishing such regulation in accordance with these conditions.

In carrying my invention into effect I prefer to make use of an exciting machine which is driven at a speed proportional to the slip frequency, the speed being zero at zero slip, for supplying part or all of the inductive drop excitation. When the inductive drop is considerable, as when operating at speeds remote from synchronism, a portion of the inductive drop excitation may be supplied by other means, for example from the secondary circuit of the main induction motor through an adjustable auto-transformer in which case the auxiliary exciting apparatus of the present invention may be combined therewith to provide smooth regulation between the regulating steps of the auto-transformer.

The features of my invention which are believed to be novel and patentable will be pointed out in the claims appended hereto. For a better understanding of my invention reference is made in the following description to the accompanying drawings in which Fig. 1 shows a speed control system where a slip responsive exciter is employed to supply excitation to a synchronous exciter which also supplies the resistance drop excitation; Fig. 2 shows the apparatus of Fig. 1 combined with an adjustable auto-transformer; and Fig. 3 shows another modification of the invention in which machine 45, 46 is driven at a speed proportional to the slip frequency and supplies the necessary inductive drop excitation.

Referring to Fig. 1, 10 represents the main induction motor supplied from a source 11. 12 is the regulating machine concatenated with motor 10 and provided with the independently excited winding 13. 14 is a synchronous machine floating upon the line 11 for the purpose of holding the speed of the regulating machine 12 constant and for synchronizing a synchronous generator 15. Machines 12, 14, and 15 are all mounted on a common shaft, as shown, and when thus arranged 14 and 15 will have the same number of poles. 16 is a commutator type frequency converter mounted on the shaft of motor 10 and will thus be arranged for the same number of poles as 10. The slip rings 17 of this frequency converter are supplied from the slip rings 18 of the synchronous exciter 15. The brushes 19 of the frequency converter are connected to and supply the field winding 13 of the regulating machine 12 and thus the frequency of the excitation supplied by the synchronous generator 15 is changed to the slip frequency of 10. The stator of the synchronous exciter 15 is provided with the two exciting windings 20 and 22 and a neutralizing winding 21. Windings 20 and 21 are in series and are supplied from a direct current source 23 through an adjusting rheostat 24, the latter being arranged so as to reverse the direction of the excitation. Winding 22 is supplied by a direct current generator 25 having an exciting winding 26 connected in series with windings 20 and 21. Generator 25 is driven by a motor 27 which may be either a synchronous or an induction motor floating on the secondary circuit 28 of the main motor 10. The speed of the set 27, 25 will therefore be proportional or approximately proportional to the slip of the main motor 10 and will be zero at zero slip. The field winding 20 serves to furnish excitation to generator 15 to the extent necessary for it to generate an electromotive force for balancing the resistance drop in the field circuit 13. Field winding 21 is arranged in quadrature relation with respect to field winding 20 and is provided to furnish the excitation necessary to balance the armature reaction of the exciting current delivered to 13 as passed through the frequency converter 16. Since the resistance drop and the armature reaction are proportional to the exciting current, it is evident that by properly proportioning the number of turns in windings 20 and 21 the two may be connected in series to accomplish these results. Field winding 22 is also arranged in quadrature relation with winding 20 on the stator of exciter 15 and is provided to furnish the excitation necessary to balance the inductive drop in the circuit of 13. This inductive drop is proportional to the flux set up by winding 13 and to the frequency thereof. Since this frequency varies with the slip frequency of the main motor it is desirable that the current in winding 22 vary in proportion to the slip. For this reason the winding 22 is supplied by the generator 25 which has a speed proportional to the slip and which will supply a correspondingly proportional current to field winding 22 for any given setting of the rheostat 24. The requirements for correct regulation are accordingly satisfied by this system.

In Fig. 2 there is illustrated a practical application of the system shown in Fig. 1 in which the principles previously described are employed for providing a smooth regulation between the steps of an auto-transformer which is used to provide a step-by-step regulation of the system over a greater range of regulation away from synchronism than is practicable with the apparatus shown in Fig. 1.

The parts used in Fig. 2 to obtain the smooth regulation between steps are indicated by reference characters similar to those used in Fig. 1 and these parts function, in Fig. 2, as previously described. In addition to the parts previously described we have the following in Fig. 2: An adjustable auto-transformer 30 is arranged to be connected between the secondary circuit 28 of the main induction motor and the field winding 13 of the regulating machine 12. An auxiliary direct current exciting circuit is provided for the synchronous generator 15 which includes field windings 32 and 33, connected in the quadrature relation corresponding to windings 20 and 21 respectively, and an adjustable resistance 34. An adjustable resistance 35 is also included in series with rheostat 34.

The auto-transformer 30 as represented here has six adjustment steps which are indicated by reference characters from 1 to 6 applied to the corresponding switch bars interconnecting the adjustment switches between the three phases. It will be noted that certain of these switch bars are carried over to the adjustable resistances 34 and 35 to interlock their adjustment switches with those of the auto-transformer, thereby providing common means for adjusting both exciting means for field winding 13. The resistances shown at 36 are merely provided to prevent a complete short circuit of the sections of the auto-transformer when passing from one step to another when one set of switches is closed before the next adjacent set is opened. The switch as shown at 37 controls the Y point of the field winding 13 and when the switches attached thereto are closed and the other switches are in the positions shown we have a connection corresponding to that shown in Fig. 1 for operation close to synchronism, at which time the auto-transformer is not used, field circuit containing windings 32 and 33 is open and the resistance 35 is cut out with the exception of a calibrating portion.

Assuming that we have reached the limit of control possible by means of the rheostat 24 and it is desired to regulate further away from synchronism, we then close the switches of step 1 and open the Y connection at 37. The corresponding turns of the auto-transformer inject a voltage into the field circuit 13 of the regulating machine suitable to balance the inductive drop corresponding to this coarse adjustment. At the same time the exciting circuit including field coils 32 and 33 is closed through the resistance 34 to furnish the additional excitation for overcoming the resistance drop and armature reaction corresponding to this step. This is somewhat increased since the resistance of the exciting circuit of winding 13 has been increased by the resistance of the transformer windings, etc. In this way the regulation may be carried through the remaining steps and the rheostat 24 is always available for fine adjustment at any part of the regulating range. It is desirable to keep the size of the machines 16, 15, 25, and 27 as small as possible for the sake of economy and yet obtain the desirable extent of fine adjustment at any point in the regulation.

By properly proportioning the regulating steps of the coarse adjustment and decreasing the current controlled by rheostat 24 as the excitation of fields 32, 33 is increased by the variable resistance 34, it is possible to utilize the auxiliary exciting apparatus to the best advantage throughout the regulating range and to this end the adjustable resistance 35 is provided in series with rheostat 24 with its adjusting means interlocked with the coarse adjustment mechanism, as shown. Thus the resistance 35 is decreased as the resistance 34 is increased, and vice versa. The extreme steps of the coarse adjustment, such as 3, 4, 5, and 6, will preferably give equal speed regulating steps of such magnitude as to use up the full capacity of the auxiliary exciting apparatus for fine adjustment between these steps. The speed regulating steps close to synchronism, such as steps 1 and 2, will preferably be made larger since a greater range of fine regulation is then possible without overloading machines 25, 15, and 16. The rheostat 24 will accordingly have to handle a greater amount of exciting current close to synchronism and the adjustable resistance 35 controlled by the coarse adjustment takes care of this. The ratio of inductive drop excitation to the resistance drop excitation supplied by the synchronous generator is decreased as the excitation supplied by the autotransformer is decreased. The exciting circuit controlled by rheostat 24 could, if desired, be regulated automatically in response to speed or load by well-known devices. The system illustrated in Fig. 2 combining a coarse adjustment by means of the autotransformer with taps, with the fine adjustment shown in Figs. 1 and 2, is capable of considerable flexibility in regard to the number of coarse steps and the speed range provided by the fine adjustment apparatus, so that for suitable conditions the fine adjustment range may be increased to include the entire range of adjustable speed desired, as shown in Fig. 1. It is also possible to add the system of Fig. 1 to existing systems already equipped with the step-by-step control to obtain the advantage of the finer regulation.

A further feature which contributes to the smoothness of the regulation is shown in Fig. 2 wherein the auto-transformer 30 is provided with a small capacity secondary 38 which serves to balance the inductive drop for steps 1 and 2. The purpose of this arrangement, instead of one having these steps on the main auto-transformer winding, is to prevent transmission of any part of the resistance drop of the current in the main motor rotor into the field system 13 when it is regulated at exact synchronism under load. Any voltage drop in the main auto-transformer winding cannot be passed in the field system by induction at zero frequency irrespective of whether or not the switches of steps 1 and 2 are closed. If such a voltage were present in the field system at synchronism it would interfere to some extent with the desired delicate control of the speed.

In some cases it might be desirable to divide the functions of the synchronous exciter 15 between two synchronous exciters connected in series, one to supply the resistance drop and the other to supply the inductive drop and armature reaction components of the excitation. This would partly avoid the quadrature relations of the field windings on a single stator.

In Fig. 3 I have illustrated another system which satisfies the requirements of correct regulation of the speed of an induction motor. This particular embodiment of the invention is claimed in a divisional application, Serial No. 235,368, filled November 23, 1927. The parts shown in Fig. 3 which perform the same functions as corresponding parts of the previous figures are indicated by similar reference characters. Thus, we have the main induction motor 10 supplied from source 11. The secondary circuit 28 of the main motor is connected to the commutator brushes of the regulating machine 12 which machine is driven by the motor 14 floating on line 11. The field 13 of the regulating machine has one end connected to the frequency changer 16 which is driven by the main motor. The frequency converter which might, if desired, be supplied by an auxiliary synchronous generator is shown supplied from line 11 through suitable regulating resistances and a transformer. The primary of this transformer is shown at 40. 41 comprises a secondary winding of this transformer which is connected to the frequency converter 16 through adjustable resistances 42 to supply the excitation necessary for overcoming the resistance drop in the circuit of the field winding 13. A further secondary transformer winding 43 arranged in quadrature relation with winding 41, together with adjustable resistances 44, may be provided if desired to supply a voltage to the frequency converter for adjusting the power factor of motor 10. Machine 45 has a distributed polyphase stator winding 46, similar to that of an induction motor, connected in the field circuit 13 and an armature similar to that of a direct current machine connected through polyphase brushes and a calibrating resistance 47 to the commutator end of the frequency converter 16. This machine 45 is driven by the motor 27 from the secondary circuit 28 of the main motor. Machines 27 and 45 will have the same number of poles and accordingly machine 45 is driven at a synchronous speed corresponding to the slip frequency of the main motor 10. The frequency obtained at the commutator end of the frequency converter 16 is exactly equal to the slip frequency of 10. If 27 is a synchronous motor, machine 45 will run at exactly its own synchronous speed and at approximately synchronous speed if 27 is an induction motor. In the first case mentioned there is no voltage induced in the rotor winding of 45 and in the second case but a very slight voltage, so that the current which flows in the armature of 45 through the calibrating resistance 47 may be assumed to be proportional to the terminal voltage of 16. The resistance 47 does not constitute a part of the regulation but is merely a means of calibrating the machine 45. At synchronous speed of motor 10 the set 27, 45 is of course stationary and the currents in the circuits supplied by the frequency converter 16 are direct currents. The current flowing in field winding 13 will be proportional to the voltage of 16.

The calibrating resistance 47 is designed and adjusted to give an armature current for machine 45 of such a magnitude that whenever the slip becomes anything else than zero, this armature current, acting as the primary current of a transformer, will induce in the winding 46, acting as the secondary of a transformer, a voltage for supplying the inductive drop in the field circuit 13; that is, the voltage induced by the alternations of the flux in 13 is balanced by the voltage induced by the alternations of the flux in 46. This condition once obtained will hold for all variations in the slip frequency of the motor 10. Thus, the resistance drop in circuit 13 is balanced by the proper setting of the resistance 42 and the inductive drop is balanced by the machine 45, 46, which supplies a voltage which is proportional to the slip frequency.

In any of the modifications above described, reversing switches or the so-called "potentiometer rheostats" such as that shown at 24 of Fig. 1 may be provided in the circuits necessary to reverse in passing through synchronism to adapt the apparatus for operation above and below synchronism. In order to avoid complicating the drawing, such reversing switches have been omitted therefrom.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States is:

1. A speed control system for induction motors comprising, in combination with such a motor, a commutator regulating machine concatenated with said motor, an exciting winding for said regulating machine and exciting means for impressing an electromotive force on said winding having components suitable for balancing the resistance drop and the inductive drop in said winding, said means including a dynamo-electric machine which is driven at a speed directly proportional to the slip of said induction motor, which speed becomes zero at zero slip.

2. A speed control system for induction motors comprising, in combination with such a motor, a commutator regulating machine concatenated with said motor, an exciting winding for said regulating machine, and means for impressing an electromotive force upon the circuit of said exciting winding having a component for controlling the inductive drop therein, said means including a dynamo-electric machine driven at a speed directly proportional to the slip of said motor, which speed becomes zero at zero slip.

3. A speed control system for induction motors comprising, in combination with such a motor, a commutator regulating machine concatenated with said motor, an exciting winding for said regulating machine, and means for impressing an electromotive force upon said exciting winding having a component for controlling the inductive drop therein, said means including an alternating current motor connected to the secondary of said induction motor and a generator driven by said alternating current motor for supplying a voltage proportional to the slip of said induction motor.

4. A speed control system for induction motors comprising, in combination with such a motor, a commutator regulating machine concatenated with said induction motor, a field winding for said regulating machine, a synchronous generator for supplying excitation to said field winding, a frequency converter connected between said field winding and synchronous generator, said synchronous generator having direct current field windings arranged in a quadrature relation for providing excitation for regulating the resistance drop and the inductive drop in the circuit supplied by said synchronous generator, and automatic means for causing the current in one of said direct current field windings to vary in proportion to the slip of said induction motor.

5. A speed control system for induction motors comprising, in combination with such a motor, a commutator regulating machine concatenated with said motor, a field winding for said regulating machine, a synchronous generator for supplying excitation to said field winding, a frequency converter connected between said synchronous generator and field winding, a direct current field winding on said synchronous generator for providing excitation for regulating the inductive drop in the circuit supplied by said synchronous generator, and a direct current generator driven at a speed proportional to the slip frequency of said induction motor for energizing said direct current field winding.

6. A speed control system for induction motors comprising, in combination with such a motor, a commutator regulating machine concatenated with said motor, a field winding for said regulating machine, means for impressing on said machine an adjustable electromotive force having components for balancing the resistance drop and the inductive drop therein, said means including a dynamo-electric machine driven at a speed directly proportional to the slip frequency of said motor, and common means for adjusting the magnitude of said components.

7. A speed control system comprising an induction motor, a regulating machine concatenated therewith, said regulating machine having a separately excited field, a synchronous generator for supplying said field winding, said generator having a pair of direct current field windings arranged in quadrature relation, a direct current generator driven at a speed proportional to the slip of said induction motor for supplying one of the field windings of said synchronous generator, a field winding for said direct current generator, a source of direct current for supplying the field winding of said direct current generator and the other field winding of said synchronous generator, and common means for adjusting the currents in said last mentioned field windings.

8. A speed control system for induction motors comprising, in combination with such a motor, a commutator regulating machine concatenated with said motor, a separately excited field winding for said regulating machine, an adjustable auto-transformer for supplying inductive drop excitation to said field winding from the secondary circuit of said induction motor, a separately excited synchronous generator for supplying inductive drop and resistance drop excitation to said field winding, and means for regulating the excitation for said field winding supplied by said two exciting means to regulate the speed of said motor while maintaining the relative magnitudes of resistance drop and inductive drop excitation in a desired relation.

9. A speed control system for induction motors comprising, in combination with such a motor, a commutator regulating machine concatenated with said motor, a separately excited field winding for said regulating machine, an adjustable auto-transformer for supplying inductive drop excitation to said field winding from the secondary circuit of said induction motor, a separately excited synchronous generator for supplying inductive drop and resistance drop excitation to said field winding, common means for controlling the excitation supplied to said field winding by said two exciting means to provide a coarse regulation of the speed of said induction motor, and separate means for controlling the excitation supplied by said synchronous generator to provide a fine regulation of the speed of said induction motor.

10. A speed control system for induction motors comprising, in combination with such a motor, a commutator regulating machine concatenated with said motor, a separately excited field winding for said regulating machine, an adjustable auto-transformer for supplying inductive drop excitation to said field winding from the secondary circuit of said induction motor, a separately excited synchronous generator for supplying resistance drop and inductive drop excitation to said field winding, a regulator for said auto-transformer, a regulator for controlling the excitation for said synchronous generator, said regulators being interlocked to control the relative magnitude of the resistance drop and inductive drop components of the excitation supplied to said field winding in a desired manner and to provide a coarse regulation of the excitation of said regulating machine, and means for independently controlling the excitation of said synchronous generator to provide a fine regulation of the excitation of said regulating machine.

11. A speed control system for induction motors comprising, in combination with such a motor, a regulating machine concatenated with said motor, a field winding for said regulating machine, an adjustable autotransformer for supplying inductive drop excitation to said field winding from the secondary circuit of said induction motor, a synchronous generator for supplying inductive drop and resistance drop excitation to said field winding, means for regulating the excitation of said synchronous generator so as to vary the relative magnitude of the inductive drop and resistance drop excitation supplied thereby to said field winding, and common control means for said auto-transformer and said synchronous generator regulating means arranged to vary the ratio of the inductive drop excitation to the resistance drop excitation supplied by said synchronous generator when the inductive drop excitation supplied by said auto-transformer is varied.

12. A speed control system for induction motors comprising, in combination with such a motor, a regulating machine concatenated with said motor, a field winding for said regulating machine, an auto-transformer provided with adjustable taps for supplying excitation to said field winding from the secondary circuit of said motor, said auto-transformer having an auxiliary secondary winding to which certain of said taps are connected to prevent resistance drop voltages in the secondary circuit of said motor from being impressed on said field winding.

13. A speed control system for induction motors comprising, in combination with such a motor, a regulating machine concatenated with said motor, a field winding for said regulating machine, an adjustable auto-transformer supplied from the secondary circuit of said induction motor, a regulator for connecting portions of said transformer in said field circuit to supply inductive drop excitation thereto, a synchronous generator for supplying resistance drop excitation to said field winding, a regulator for varying the excitation of said synchronous generator, said regulators being interconnected so as to vary the resistance drop excitation supplied by said synchronous generator in proportion to the amount of resistance variation of said field circuit caused by the regulation of said transformer.

In witness whereof, I have hereunto set my hand this 16th day of February, 1927.

JOHN I. HULL.